No. 706,225. Patented Aug. 5, 1902.
J. A. EKELUND.
COMBINED CANE AND FISH POLE.
(Application filed Nov. 26, 1901.)
(No Model.)
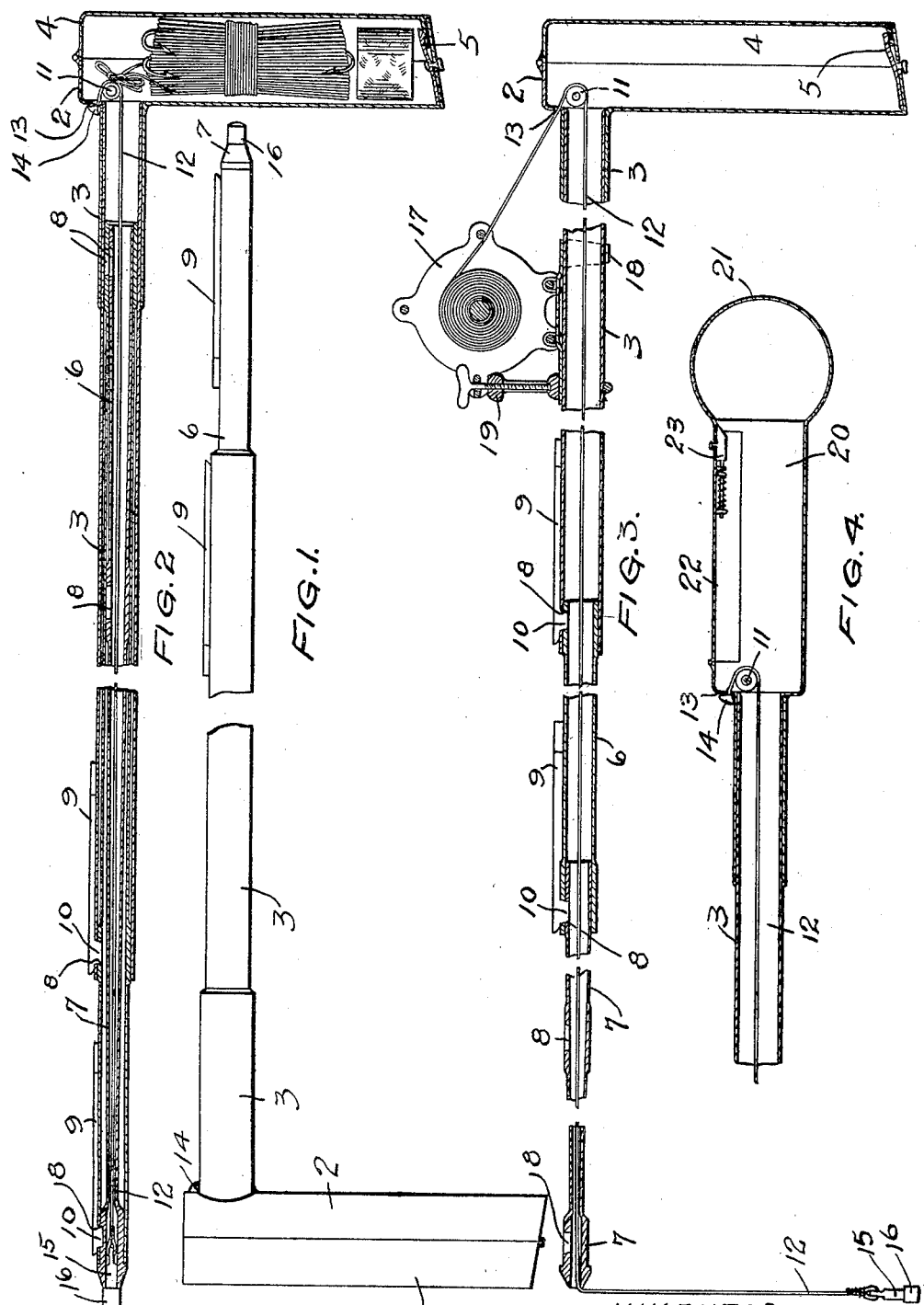
WITNESSES.
INVENTOR
JOHN A. EKELUND
BY
ATTORNEYS.

UNITED STATES PATENT OFFICE.

JOHN A. EKELUND, OF MINNEAPOLIS, MINNESOTA, ASSIGNOR OF ONE-FOURTH TO NELS A. JOHNSON, OF MURDOCK, MINNESOTA.

COMBINED CANE AND FISHPOLE.

SPECIFICATION forming part of Letters Patent No. 706,225, dated August 5, 1902.

Application filed November 26, 1901. Serial No. 83,688. (No model.)

*To all whom it may concern:*

Be it known that I, JOHN A. EKELUND, of Minneapolis, Hennepin county, Minnesota, have invented certain new and useful Improvements in a Combined Cane and Fishpole, of which the following is a specification.

My invention relates to a device adapted for use both as a cane and a fishpole; and the object of the invention is to provide a light but strong and durable cane which whenever desired can be readily extended to form a fishpole.

A further object is to provide a device for use as a cane and have space wherein the fish-line may be stored and kept ready for instant use.

Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of a combined cane and fishpole embodying my invention. Fig. 2 is a longitudinal section of the same when closed. Fig. 3 is a similar view showing the sections extended. Fig. 4 is a detail sectional view showing a modified form of handle.

In the drawings, wherein for convenience of illustration sections are broken away, 2 represents the hollow handle suitably secured to the section 3, that forms the grip portion of the device when used as a fishing-pole. The handle 2 is preferably at right angles to the section 3 and provided with a hinged cover 4, normally held closed by a spring-catch 5. The device has preferably a second section 6, telescoping with the section 3, and a third section 7, telescoping with the section 6. These sections are of suitable length, so that when telescoped they will form a stick of appropriate length for the cane. I have provided the device with three telescoping sections; but a greater or less number may be employed, if preferred. Each of the telescoping sections is provided with a slot 8, and the outer section preferably has two to permit its adjustment at different lengths when used as the tip of a fishpole. The sections 3 and 6 are provided with spring-catches 9, having tongues 10, that are adapted to enter the slots 8 and lock the telescoping sections together when extended. The sections are all preferably made of a light tubing, and near the inner end of the section 3 I provide a small roller 11, around which the fish-line 12 is passed. One end of the line passes through a hole 13 in the handle 2 and is provided with a button 14, that prevents the line from being drawn entirely through the hole. The opposite end of the line is provided with a pin 15, having a head 16, which prevents the line from being drawn into the tip 7 and also forms a cap or ferrule when the device is used as a cane. A portion of the line intermediate to the button 14 and the pin 15 is folded into compact form and placed within the hollow handle 2, where there is room also for the hooks and the cork, if one is used. In folding up the line the pin 15 is drawn snugly into the end of the tip 7, and with the line that runs through the sections held taut a knot is made near the roll 11, which will hold the button 14 and the pin in the outer end of the outer section or tip securely in place. Access to the knot in the line may be had at any time by means of the hinged cover 4.

To use the device as a fishpole, the knot in the line is untied, and the sections may then be extended, and a reel 17 may be provided, to the barrel of which the button 14 is attached to permit the line to be wound up. The reel is secured to the inner section 3 in any suitable manner, as by a hook 18 and a clamp device 19. As the sections are pulled apart the springs 9 will drop into the slots adapted to receive them and will lock the sections firmly against being extended farther or collapsed until such time as it is desired to again use the device as a cane. The outer section having two slots can be adjusted to vary the length of the pole-tip to suit the requirements of the fisherman. To collapse the device, the springs are disengaged from the slots in the sections and the sections telescoped together, the operator winding up the line as the pole is collapsed. The line is then drawn into the hollow handle and folded in compact form, after which the reel may be removed.

In Fig. 4 I have shown a modification of the handle which consists in arranging the hollow portion 20 thereof in line with the section 3 and providing a knob 21 thereon. A hinged door 22 permits access to the hollow handle, and said door is normally held closed by a spring-catch 23.

I claim as my invention—

1. A combined cane and fishing-pole, comprising two or more telescoping sections, a hollow handle wherein that portion of the line intermediate to its ends may be folded, means for securing one end of the line near said handle and means for securing the opposite end in the outer section, substantially as described.

2. A combined cane and fishing-pole, comprising two or more telescoping sections, a hollow handle wherein that portion of the line intermediate to its ends may be folded, one end of the line extending through a hole in said handle and provided with a button, and the opposite end of the line extending through said telescoping sections, and provided with a head or cap at the outer end of the outer section, substantially as described.

3. A combined cane and fishing-pole, comprising two or more telescoping sections, a hollow handle provided at right angles to said sections and having a hinged cover and wherein a fishing-line may be folded, one end of said line being provided with a button and extending through a hole near the folded portion of said line and the opposite end of the line being provided with a head or cap fitting into the end of the outer section.

4. A combined cane and fishing-pole, comprising two or more telescoping sections, a hollow handle wherein the line may be folded, means for securing one end of the line in the outer section or tip of the pole, a roller provided near the folded portion of said line and around which the other end of the line is passed, and a button provided outside of said head and connected to said last-named end.

5. A combined cane and fishing-pole, comprising two or more telescoping sections provided with slots or notches, spring-catches adapted to enter said slots and lock said sections when extended, a hollow handle wherein the portion of the line intermediate to its ends may be folded, one end of said line extending outside said handle and adapted to be connected to a reel and the other end of the line being secured in the outer or tip section.

6. A combined cane and fishing-pole, comprising two or more telescoping sections provided with a hollow handle adapted to receive a folded fishing-line, a plug provided in the open end of the outer section and to which one end of the line is attached, and a button or cap provided near said handle and to which the opposite end of the line is connected, substantially as described.

7. A combined cane and fishing-pole, comprising two or more telescoping sections, means for locking said sections in their extended position, and for rendering the outer section capable of adjustment to different lengths, a hollow handle provided on the inner section, said handle being provided with a cover and adapted to contain a fishing-line, substantially as described.

8. A combined cane and fishing-pole, comprising two or more telescoping sections, means for locking them in their extended position, a hollow handle portion wherein the line intermediate to its ends may be folded, and means for securing the ends of said line at or near the opposite ends of the pole.

9. A combined cane and fishing-pole, comprising two or more telescoping sections, means for locking said sections when extended, a hollow handle portion wherein the line intermediate to its ends may be folded, one end of said line extending outside said handle portion and adapted to be connected to the reel, and the outer end of the line being secured in the outer or tip section.

In witness whereof I have hereunto set my hand this 19th day of November, 1901.

JOHN A. EKELUND.

In presence of—
  RICHARD PAUL,
  M. C. NOONAN.